(12) United States Patent
Durand et al.

(10) Patent No.: US 8,195,791 B2
(45) Date of Patent: Jun. 5, 2012

(54) DISTINGUISHING BETWEEN LIVE CONTENT AND RECORDED CONTENT

(75) Inventors: Alain Durand, Rennes (FR); Yan-Mei Tang-Talpin, Saint Gregoire (FR); Olivier Heen, Domloup (FR)

(73) Assignee: Thomson Licensing (FR)

( * ) Notice: Subject to any disclaimer, the term of this patent is extended or adjusted under 35 U.S.C. 154(b) by 286 days.

(21) Appl. No.: 11/883,042

(22) PCT Filed: Jan. 16, 2006

(86) PCT No.: PCT/EP2006/050226
§ 371 (c)(1),
(2), (4) Date: Jul. 25, 2007

(87) PCT Pub. No.: WO2006/082130
PCT Pub. Date: Aug. 10, 2006

(65) Prior Publication Data
US 2008/0104234 A1    May 1, 2008

(30) Foreign Application Priority Data

Feb. 2, 2005 (EP) .................................... 05100707

(51) Int. Cl.
*G06F 15/173* (2006.01)
(52) U.S. Cl. ........ 709/224; 709/223; 709/233; 307/486; 307/489; 725/32
(58) Field of Classification Search .......... 709/223–225; 725/32; 370/486–489
See application file for complete search history.

(56) References Cited

U.S. PATENT DOCUMENTS 6,421,358 B1 * 7/2002 Stimmel et al. ............... 370/489
6,788,709 B1 * 9/2004 Hyakutake .................... 370/486
(Continued)

FOREIGN PATENT DOCUMENTS
WO    WO 03/021959    3/2003

OTHER PUBLICATIONS

Thomson Multimedia: "SmartRight Contribution to Rights Management & Protection Specifications"[Online] May 22, 2002, pp. 1-2~ XP002310904 Retrieved from the Internet: URL:http://ww.tv-anytime.org> [retrieved on Dec. 15, 2004] p. 4-page 10.*

(Continued)

*Primary Examiner* — Wing Chan
*Assistant Examiner* — Razu Miah
(74) *Attorney, Agent, or Firm* — Tutunjian & Bitetto, P.C.

(57) ABSTRACT

Distinguishing between live and recorded content in a network comprising a rendering device, an access device, and a storage device. The rendering device broadcasts a message requesting devices in the network to respond if they diffuse a content, and sets a timer. The devices respond if they diffuse the content. The rendering device then determines that the content is: live, if it has received a response from the access device; recorded, if it has received a response from the storage device, but not from the access device; and illegal, if it has not received a response before time-out of the timer. There is further a "still live delay" after diffusion of the content during which the access device responds that it is diffusing the content, and following which it may send a content release message to the storage device that may then respond to request messages.

12 Claims, 4 Drawing Sheets

U.S. PATENT DOCUMENTS

| | | | |
|---|---|---|---|
| 6,799,283 B1* | 9/2004 | Tamai et al. | 714/6.12 |
| 6,891,859 B2* | 5/2005 | Hyakutake | 370/486 |
| 7,610,396 B2* | 10/2009 | Taglienti et al. | 709/233 |
| 7,817,569 B2* | 10/2010 | Park | 370/252 |
| 8,046,797 B2* | 10/2011 | Bentolila et al. | 725/46 |
| 2002/0049792 A1* | 4/2002 | Wilcox et al. | 707/522 |
| 2002/0083043 A1* | 6/2002 | Hoshi et al. | 707/1 |
| 2002/0132667 A1* | 9/2002 | Shoji | 463/43 |
| 2002/0156660 A1* | 10/2002 | Nishimura et al. | 705/5 |
| 2002/0161685 A1* | 10/2002 | Dwinnell | 705/36 |
| 2002/0174442 A1* | 11/2002 | Nomura | 725/115 |
| 2002/0194607 A1* | 12/2002 | Connelly | 725/87 |
| 2003/0043850 A1* | 3/2003 | Kobayashi | 370/474 |
| 2003/0050721 A1* | 3/2003 | Yasushi et al. | 700/94 |
| 2003/0066090 A1* | 4/2003 | Traw et al. | 725/114 |
| 2003/0236885 A1* | 12/2003 | Takeuchi et al. | 709/225 |
| 2004/0117825 A1* | 6/2004 | Watkins | 725/40 |
| 2004/0210926 A1* | 10/2004 | Francis et al. | 725/25 |
| 2005/0050557 A1* | 3/2005 | Gabryjelski et al. | 720/600 |
| 2005/0102703 A1* | 5/2005 | Querashi et al. | 725/117 |
| 2005/0187960 A1* | 8/2005 | Nomura | 707/101 |
| 2006/0020971 A1* | 1/2006 | Poslinski | 725/44 |
| 2006/0026654 A1* | 2/2006 | An et al. | 725/89 |
| 2006/0059535 A1* | 3/2006 | D'Avello | 725/139 |
| 2006/0165376 A1* | 7/2006 | Park | 386/83 |
| 2006/0291506 A1* | 12/2006 | Cain | 370/486 |
| 2007/0056015 A1* | 3/2007 | Kortum et al. | 725/134 |
| 2007/0250636 A1* | 10/2007 | Stephens | 709/231 |
| 2008/0005762 A1* | 1/2008 | Seko | 725/32 |
| 2008/0019276 A1* | 1/2008 | Takatsuji et al. | 370/236 |
| 2008/0022331 A1* | 1/2008 | Barrett | 725/89 |
| 2008/0027898 A1* | 1/2008 | Matsuo et al. | 707/1 |
| 2008/0155618 A1* | 6/2008 | Grady et al. | 725/97 |
| 2008/0275974 A1* | 11/2008 | Rackiewicz | 709/223 |
| 2009/0022477 A1* | 1/2009 | Petkovic et al. | 386/83 |

OTHER PUBLICATIONS

Thomson Multimedia: "SmartRight Contribution to Rights Management & Protection Specifications" [Online] May 22, 2002, pp. 1-29.

Search Report Dated Apr. 6, 2006.

SmartRight Technical White Paper, Thomson, Version 1.7, Jan. 2003.

* cited by examiner

DISTINGUISHING BETWEEN LIVE CONTENT AND RECORDED CONTENT

This application claims the benefit, under 35 U.S.C. §365 of International Application PCT/EP2006/050226, filed Jan. 16, 2006, which was published in accordance with PCT Article 21(2) on Aug. 10, 2006 in English and which claims the benefit of European patent application No. 05100707.8, filed on Feb. 2, 2005.

The present invention relates generally to digital media systems, and in particular to copy protection in digital home networks.

In digital media systems it is sometimes useful to be able to distinguish between live content and recorded content. An exemplary reason for this is that, for example in the requirements defined Digital Video Broadcast Copy Protection (DVB) Group, proximity control does not apply to a content for ever but will be relaxed when a certain predetermined condition is met. A first possible condition is that proximity control is relaxed as soon as it is no more live content. A second possible condition is that it is relaxed after a fixed amount of time following the live broadcast. A third possible condition is that it is relaxed at a fixed date. It can be seen, however, that the first and the third conditions may be seen as variations on the theme of the second condition: the fixed amount of time is zero for the first condition, and to whatever time it needs to arrive at the date for the third condition. Other exemplary conditions are conditional; proximity control may for example be relaxed for a user if he paid extra to access the content or if he has a certain user profile, or as soon as a certain content is broadcast.

One method of distinguishing between live and recorded content within a home network is to have the rendering device determine whether the content it is receiving comes from a storage device—recorded content—or from an access device, that is the device through which the content passes when it enters the home network—live content.

However, a problem may occur when the storage device uses so-called trick modes, e.g. replaying live content after a short delay. In this case, the rendering device is led to believe that the content is recorded, while it should be regarded as live content at least for as long as the access device is diffusing the content. In this case, trick modes are easy circumvention tools for the proximity control. A user would just have to watch the content with a delay of five seconds to bypass the control.

It can therefore be appreciated that there is a need for a solution that allows a rendering device to distinguish between live content and recorded content, including when trick mode is used. This invention provides such a solution.

In a first aspect, the invention is directed to a device in a digital network further comprising an access device and a storage device. The device comprises a processor adapted to broadcast a message requesting devices diffusing a content to respond, and, upon reception of a response, determine that the content is live content if the response was sent from the access device.

In a preferred embodiment, the processor is further adapted to determine that the content is recorded content if it receives a response only from the storage device.

It is further advantageous that the processor waits a predetermined time after reception of the response before determining if the content is live content or recorded content. This way, in case both the access device and the storage device respond, the processor will not make a hasty decision in case the response from the storage device arrives first.

In another preferred embodiment, the processor is further adapted to set a timer after having broadcast the message and to refuse to render the content if no response is received before the timer times out.

In a second aspect, the invention is directed to a method for distinguishing between live content and recorded content in a digital network comprising a rendering device, an access device, and a storage device. The rendering device broadcasts a message requesting other devices in the network to respond if they diffuse a content. The access device responds if it diffuses the content, as does the storage device. The rendering device determines that the content is live, if it has received a response from the access device; recorded, if it has received a response from the storage device, but not from the access device; and illegal, if it has not received a response.

In a first preferred embodiment, the rendering device sets a timer, and waits for the time-out of the timer before determining that the content is illegal.

In a second preferred embodiment, the storage device does not respond if it is also recording the content.

In a third preferred embodiment, there is a period after diffusion of the content, during which the access device responds, upon reception of a request message, as if it were still diffusing the content.

In a fourth preferred embodiment, there is a period after diffusion of the content, after which the access device sends a content release message to the storage device. The storage device does not respond to a request message from the rendering device until it receives the content release message.

In a third aspect, the invention is directed to a system comprising a rendering device, an access device, and a storage device. The rendering device is adapted to broadcast a message requesting other devices in the system to respond if they diffuse a content; and to determine that the content is: live, if it has received a response from the access device; recorded, if it has received a response from the storage device, but not from the access device; and illegal, if it has not received a response. The access device and the storage device are adapted to respond, independently of one another, if they diffuse the content.

In a first preferred embodiment, the rendering device further is adapted to set a timer, and wait for the time-out of the timer before determining that the content is illegal.

In a second preferred embodiment, the storage device is adapted to not respond if it is also recording the content.

In a third preferred embodiment, the access device is adapted to respond, during a period after diffusion of the content, upon reception of a request message, as if it were still diffusing the content.

In a fourth preferred embodiment, there is a period after diffusion of the content, following which the access device sends a content release message to the storage device that is adapted to not respond to a request message from the rendering device until it receives the content release message.

In a fourth aspect, the invention is directed to an access device for use in a digital network further comprising a rendering device. The access device comprises a processor that is adapted to receive, from the rendering device, a message requesting a response if the access device diffuses a content; and to respond, if it diffuses the content.

In a first preferred embodiment, the processor is adapted to respond, during a period after diffusion of the content, upon reception of the request message, as if the access device were still diffusing the content.

In a second preferred embodiment, the network further comprises a storage device, and the processor is adapted to send a content release message to the storage device after a period following diffusion of the content.

In a fifth aspect, the invention is directed to a storage device in a digital network further comprising a rendering device. The storage device comprises a processor that is adapted to receive, from the rendering device, a message requesting a response if the storage device diffuses a content; and to respond, if the storage device diffuses the content.

In a first preferred embodiment, the processor is adapted to not respond if the storage device is also recording the content.

In a second preferred embodiment, the network further comprises an access device, and the processor is adapted to not respond to a request message from the rendering device until it receives a content release message.

Preferred features of the present invention will now be described, by way of example, with reference to the accompanying drawings, in which.

PREFERRED EMBODIMENT OF THE INVENTION

Figure 1:
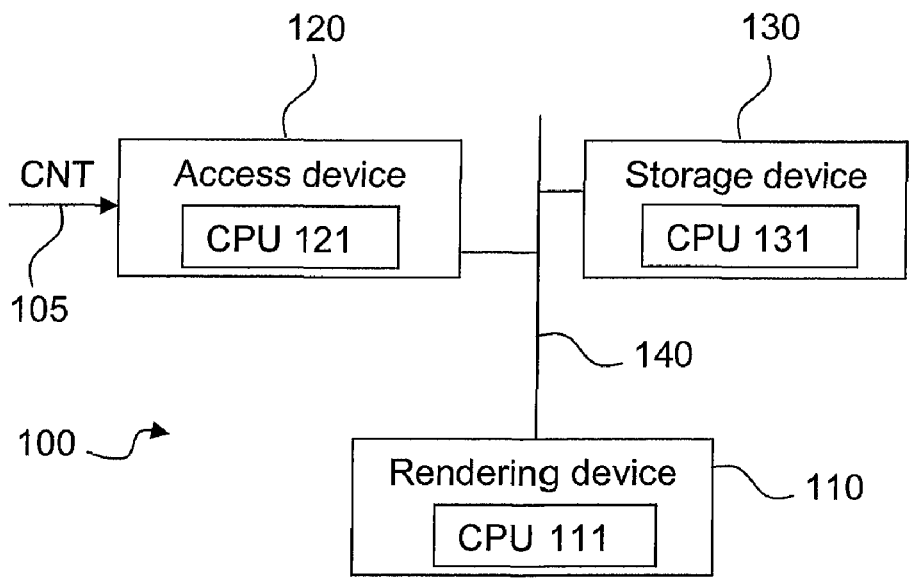
FIG. 1 illustrates an exemplary digital network in which the invention is used.

FIG. 1 illustrates an exemplary digital network 100 (also called system), advantageously for use in a user's home, in which the invention is used. The network 100 comprises a rendering device 110, an access device (AD) 120, and a storage device (SD) 130, connected to exemplary connection 140. The rendering device 110 comprises a processor 111 adapted to send messages and to distinguish between live and recorded content, as will be further described below. The access device 120 and the storage device both comprise a processor 121, 131 for receiving and sending messages. Simplifying somewhat, the network 100 normally works as follows: the access device 120 receives digital content CNT over a connection 105, and broadcasts the content to the storage device 130 and the rendering device 110 where it is made available to the user.

When the system is used in "trick mode", i.e. live content is recorded and delivered from the storage device 130 to the rendering device 110 after a short delay, typically ranging from seconds to a number of minutes.

FIGS. 2a to 2h (together referred to as FIG. 2) illustrate messages of various scenarios according to embodiments of the invention. In order to distinguish between live and recorded content, the processor 111 of the rendering device 110 first broadcasts a message 115, which in the exemplary network 100 is received by the processors 121, 131 of the access device 120 and the storage device 130. The message 115 requests the recipients to respond if they diffuse the content referred to in the message 115, the content being referred to by a content identifier (CID). The CID is picked at random by the processor 121 of the access device 120 upon reception of the content. In for example SmartRight™, the CID is an 8-byte number; the probability that two different contents share the same number is consequently very low.

Figure 2A:
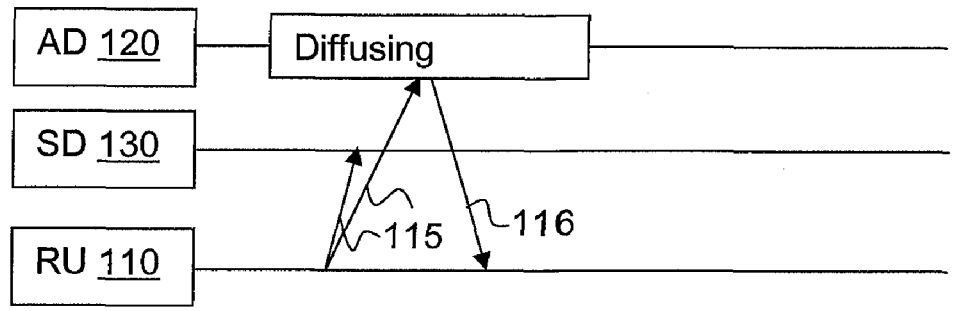
FIGS. 2a to 2h illustrate message flows of various scenarios according to embodiments of the invention.
Figure 2B:
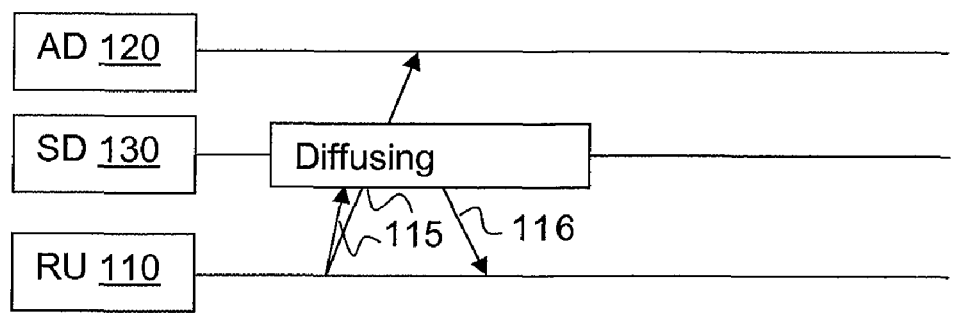
Figure 2C:
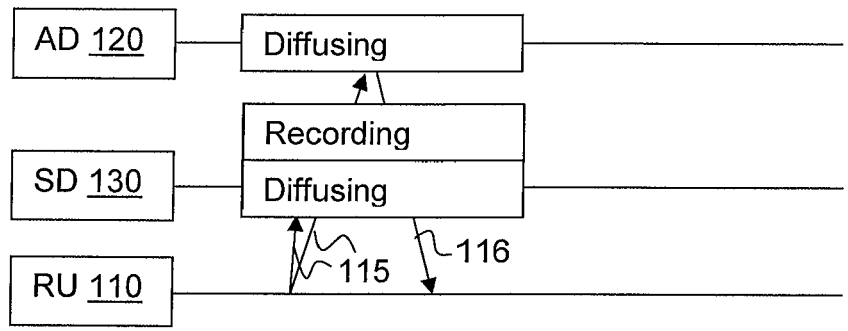

According to an embodiment of the invention, if the access device 120 diffuses the content its processor 121 responds with a message 116 (FIG. 2a), preferably using the standard view-only protocol described in WO 02/47356 "Method Of Secure Transmission Of Digital Data From A Source To A Receiver" if the content is view-only, and the Message Authentication Code (MAC) part of the view-only protocol if the content is private-copy content. The processor 131 of the storage device 130 responds, preferably using the source authentication protocol described in WO 03/088612 "Method For The Anonymous Authentication Of A Data Transmitter" if the storage device diffuses the content (FIG. 2b), but not if it records and diffuses the content (FIG. 2c).

Figure 2D:
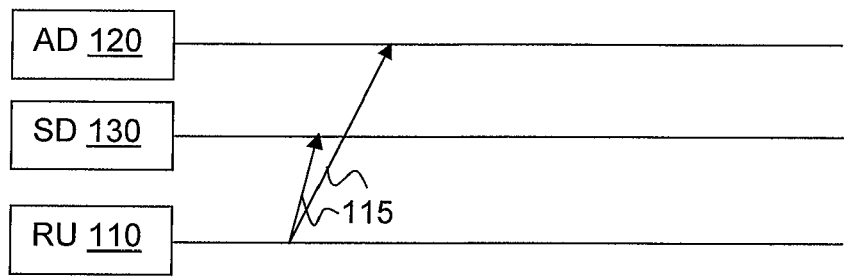

Thus, if the response comes from the access device 120, the content is live, if the response comes from the storage device 130, the content is recorded content, but if the rendering device 110 receives no answer, then the content is illegal and will not be rendered (FIG. 2d). Given that the processor 111 of the rendering device 110 deduces that content is illegal when it receives no answer at all, it should preferably ensure that there was no response. This can be achieved by waiting a predetermined time before concluding that the content is illegal. As an example, a typical timeout value in Firewire networks is 3 seconds. Another possibility is that the processor 111 of the rendering device 110 should send a certain number of request messages 115 and wait for the responses (or rather the absence of responses) before concluding that the content is illegal.

Table 1 summarises these four possibilities hereinbefore.

TABLE 1 cases for distinguishing content status

|  | Answer from AD | No answer from AD |
|---|---|---|
| Answer from SD | N/A | Content is recorded |
| No answer from SD | Content is live | Content is illegal |

Figure 2E:
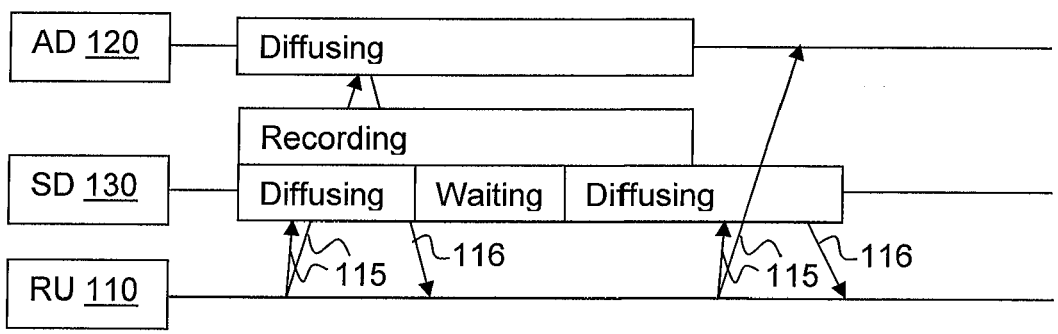

FIG. 2e illustrates messages sent in trick mode. As can be seen in the Figure, the storage device 130 records while the access unit 120 diffuses content. At first, the storage device 130 also diffuses the content, then it pauses for a while, after which it resumes diffusion. As illustrated in the left part of the Figure, only the access device 120 responds with a message 116 while it is diffusing, while the storage device 130 responds with a message 116 once the access device's 120 diffusion is over.

Figure 2F:
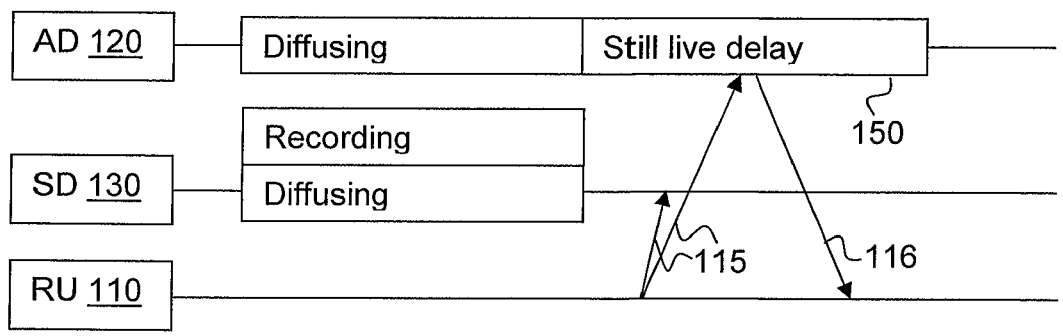
Figure 2G:
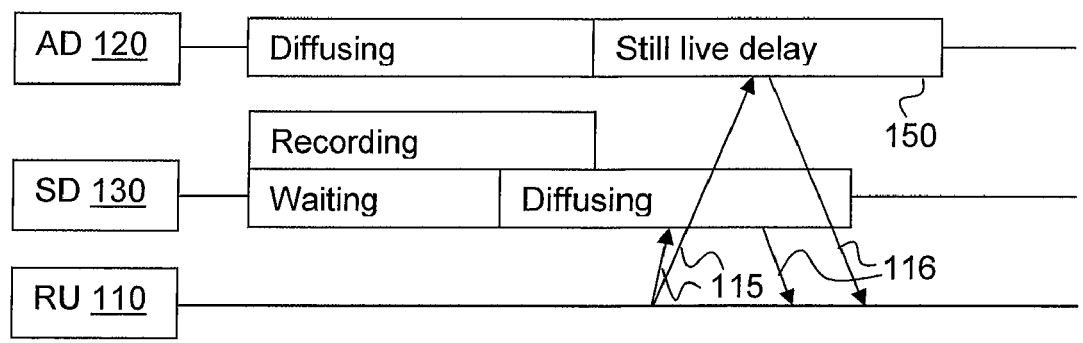

According to a further embodiment of the invention, the processor 121 of the access device 120 continues to respond during a predetermined time period, "still live delay" 150, after the end of the content diffusion (FIG. 2f). This means that the content is considered as live during that period and consequently that live content usage rules apply. The "still live delay" 150 does not necessarily correspond to a time period; the delay may also end at the fulfillment of at least one other condition as described hereinbefore, such as if the user paid a premium to access the content. In these cases there is then a fourth alternative to the response pattern hereinbefore: when content is diffused by the storage device 130 during the still live delay 150, both the processors 121, 131 of the storage device 130 and the access device 120 respond, which should be interpreted that the content is live (FIG. 2g). The access device 120 thus considers that it diffuses the content during the still live delay 150. When the fourth alternative is possible, it is preferable for the processor 111 to wait a predetermined time if the first response 116 it receives comes from the storage device 130. This way, the processor 111 will not erroneously conclude that the content is recorded before the arrival of the response from the access device 120. These possibilities are summarised in Table 2:

TABLE 2 cases for distinguishing content status

|  | Answer from AD | No answer from AD |
|---|---|---|
| Answer from SD | Content is live | Content is recorded |
| No answer from SD | Content is live | Content is illegal |

However, if the further embodiment is implemented as described hereinbefore, it is possible to circumvent part of the protection. If messages to and from the access device 120 are blocked or if the access device 120 is switched off, then its processor 121 will not respond, leaving the possibility open to access the content from the storage device 130. It should be noted that this applies both before the end of the live diffusion and during the still live delay 150 (by accessing the recorded content only).

Figure 2H:
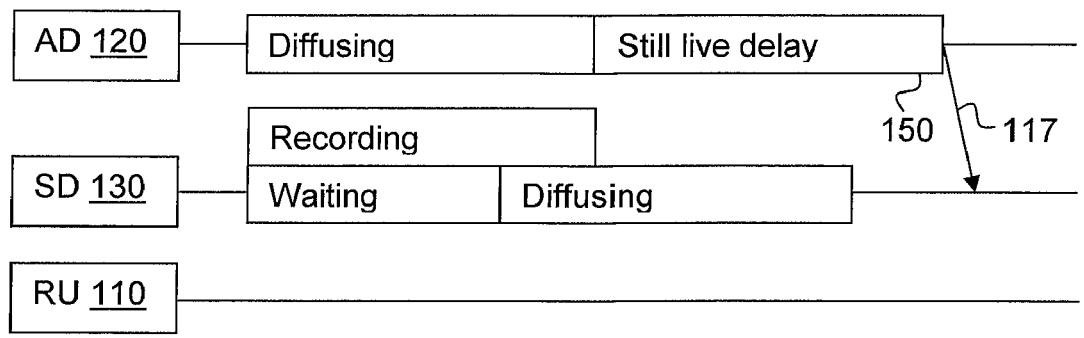

It is thus preferable that the processor 131 of the storage device 130 does not respond to a request message 115 from the rendering device 110 until it receives a content release message 117 from the access device 120, as illustrated in FIG. 2h, or, as a possible extension, until a predetermined time has passed. If a storage device records content provided by another storage device, the recording storage device will not respond to a request message 115 until it receives a content release message 117, either directly from the access device 120 or forwarded from the providing storage device 130.

Figure 3:
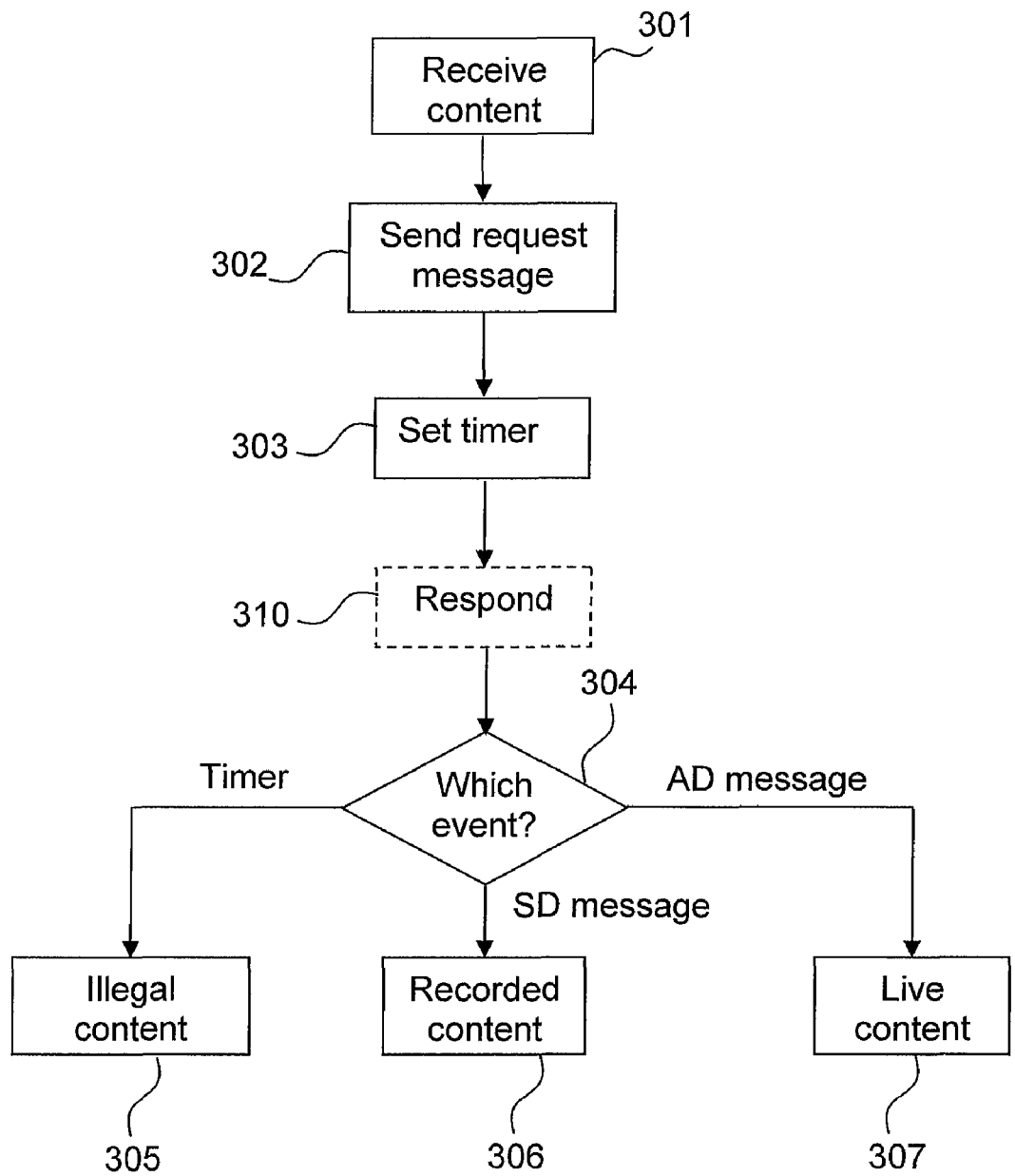
FIG. 3 illustrates a flow chart of a method according to a preferred embodiment of the invention.

FIG. 3 illustrates a flow chart of a method according to a preferred embodiment of the invention. In step 301, the rendering device 110 receives content with a dedicated CID. The processor 111 of the rendering device 110 then broadcasts a request message 115 in step 302, sets a timer (that does not necessarily need great precision, so a relatively cheap timer may be used) in step 303, and waits for an event. If applicable, the processors of the devices then respond, step 310. If the event, in step 304, is a time-out, then the processor 111 determines that the content is illegal (step 305) and refuses to render the content (not shown). If the event is the reception by the processor 111 of a message 116 from the storage device 130, then the processor 111 concludes that the content is recorded (step 306). If the event is the reception by the processor 111 of a message from the access device 110, then the processor 111 concludes that the content is live (step 307).

It can thus be appreciated that the present invention provides a way for a rendering device in a digital home network comprising an access device and a storage device to distinguish between live and recorded content.

It will be understood that the present invention has been described purely by way of example, and modifications of detail can be made without departing from the scope of the invention.

It will also be understood that it is possible for one physical device to accommodate the functions of more than one device described hereinbefore. For example, an access device and a storage device may be co-located in a device. In such a case, "access device" refers to the part handling access device functions in the multifunction device and so on. In some cases, simplifications may be possible: e.g. a device that combines functionalities of an access device and a storage device will if possible never answer twice but only provide one relevant answer.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A rendering device in a digital network having an access device and a storage device, wherein the rendering device comprises a processor configured to:
   receive a content;
   broadcast a message requesting the access device and the storage device to respond if they are diffusing the content;
   receive at least one response from the access device or from the storage device, the at least one response comprising a first response from the access device indicating that the access device is diffusing the content or a first response from the storage device indicating that the storage device is diffusing the content; wherein the first response has been independently sent by the access device or the storage device;
   wait a predetermined time after reception of the first response before determining if the content is live or recorded;
   determine that the content is live if the at least one response comprises a response only from the access device or responses from both the access device and the storage device; and
   determine that the content is recorded if the at least one response comprises a response only from the storage device.

2. The rendering device as claimed in claim 1, wherein the processor is further configured to set a timer after having broadcast the message and to refuse to render the content if no response is received before the timer times out.

3. A method for distinguishing between live content and recorded content in a digital network having a rendering device, an access device, and a storage device, the method comprising the steps of:
   receiving by the rendering device a content;
   broadcasting by the rendering device a message requesting the storage device and the access device to respond if they diffuse the content;
   responding by the access device if it diffuses the content;
   responding by the storage device if it diffuses the content;
   receiving by the rendering device at least one response from the access device or from the storage device, the at least one response comprising a first response from the access device indicating that the access device is diffusing the content or a first response from the storage device indicating that the storage device is diffusing the content;
   waiting by the rendering device a predetermined time after reception of the first response before determining if the content is live or recorded;
   determining by the rendering device that the content is live if the at least one response comprises a response only from the access device or responses from both the access device and the storage device; and
   determining by the rendering device that the content is recorded if the at least one response comprises a response only from the storage device,
   the access device and the storage device being adapted to respond, independently of one another, if they diffuse the content.

4. The method as claimed in claim 3, wherein the determining by the rendering device that the content is live further comprises determining that the content is recorded if the rendering device received a response from the storage device, but not from the access device.

5. The method as claimed in claim 3, wherein the storage device does not respond if it is also recording the content.

6. The method as claimed in claim 3, wherein there is a period after diffusion of the content, during which the access device responds, upon reception of a request message, as if it were still diffusing the content.

7. The method as claimed in claim 3, wherein there is a period after diffusion of the content, after which the access device sends a content release message to the storage device, and in that the storage device does not respond to a request message from the rendering device until it receives the content release message.

8. A system having a rendering device, an access device, and a storage device, the system comprising:
the rendering device is configured to:
receive a content;
broadcast a message requesting other devices in the system to respond if they diffuse the content;
receive at least one response from the access device or from the storage device, the at least one response comprising a first response from the access device indicating that the access device is diffusing the content or a first response from the storage device indicating that the storage device is diffusing the content;
wait a predetermined time after reception of the first response before determining if the content is live or recorded;
determine that the content is live if the at least one response comprises a response only from the access device or responses from both the access device and the storage device; and
determine that the content is recorded if the at least one response comprises a response only from the storage device,
the access device and the storage device being adapted to respond, independently of one another, if they diffuse the content.

9. The system as claimed in claim 8, wherein the rendering device is further configured to determine that the content is recorded if it has received a response from the storage device, but not from the access device.

10. The system as claimed in claim 8, wherein the storage device is configured to not respond if it is also recording the content.

11. The system as claimed in claim 8, wherein the access device is configured to respond, during a period after diffusion of the content, upon reception of a request message, as if it were still diffusing the content.

12. The system as claimed in claim 8, wherein there is a period after diffusion of the content, following which the access device is configured to send a content release message to the storage device, and in that the storage device is configured to not respond to a request message from the rendering device until it after reception of the content release message from the access device.

* * * * *